Figure 1:
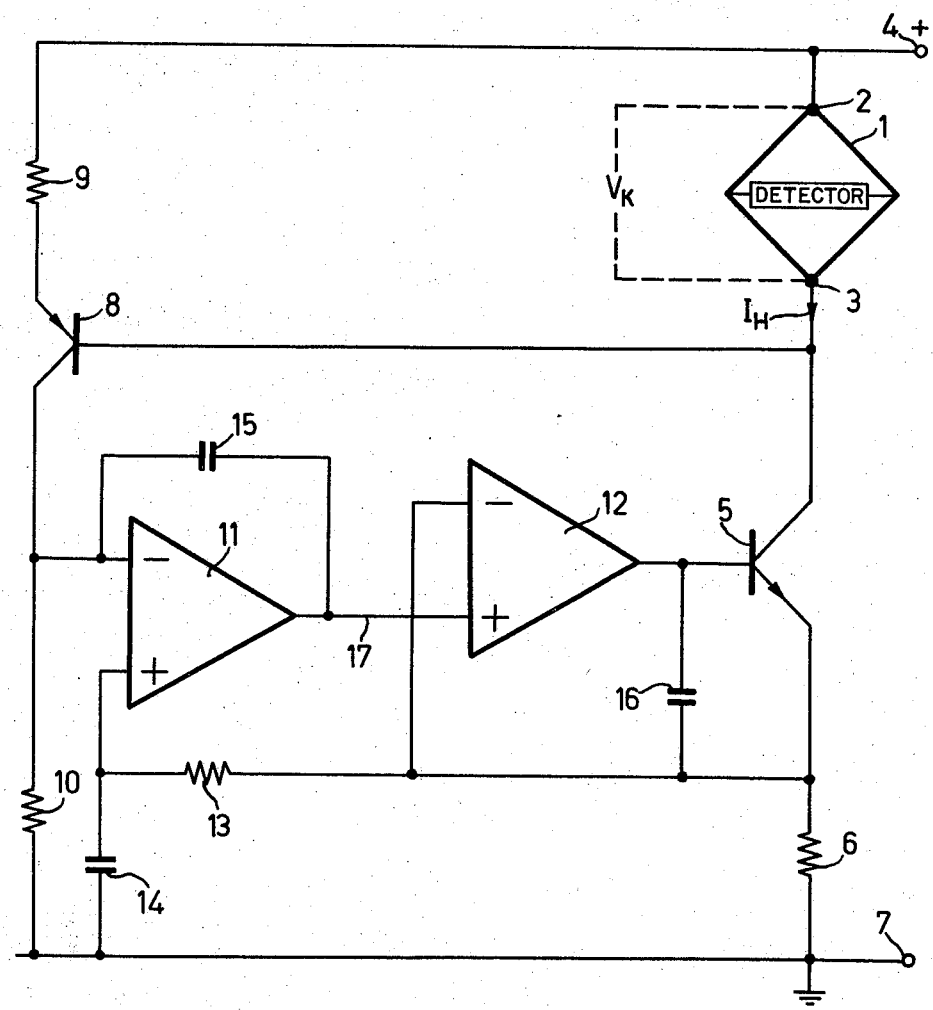

United States Patent [19]

MacDonald

[11] 3,864,959
[45] Feb. 11, 1975

[54] THERMAL CONDUCTIVITY DETECTOR APPARATUS

[75] Inventor: John Marshall MacDonald, Cambridge, England

[73] Assignee: Pye Limited, Cambridge, England

[22] Filed: Dec. 16, 1971

[21] Appl. No.: 208,648

[52] U.S. Cl. ............................................... 73/27 R
[51] Int. Cl. .......................................... G01n 25/36
[58] Field of Search............... 73/27 R, 25, 23.1, 23, 73/26, 88.5 R; 324/105, 57 R, 61 R, 71 R

[56] References Cited
UNITED STATES PATENTS

| | | | |
|---|---|---|---|
| 2,759,354 | 8/1956 | Cherry et al. | 73/27 R |
| 3,207,984 | 9/1965 | Tolliver | 324/105 |
| 3,429,178 | 2/1969 | Durbin | 73/27 R |
| 3,480,397 | 11/1969 | Baumgartel | 73/27 R |
| 3,548,295 | 12/1970 | Borer | 324/105 X |
| 3,616,677 | 11/1971 | Oppegaard | 73/27 R |
| 3,634,757 | 1/1972 | Monomakhoff | 73/27 R X |
| 3,683,671 | 8/1972 | Van Swaay | 73/27 R |

*Primary Examiner*—Jerry W. Myracle
*Assistant Examiner*—Stephen A. Kreitman
*Attorney, Agent, or Firm*—Frank R. Trifari; Bernard Franzblau

[57] ABSTRACT

A thermal conductivity detector device for use as a gas chromatograph output detector includes a sensing filament and a reference filament connected in a bridge circuit which in turn is connected to a controllable filament heating current supply source. To prevent overheating of the reference filament, the resistance of the filament bridge circuit is measured and the heating current is controlled in response thereto so as to maintain the mean of the temperatures of the sensing and reference filaments substantially constant despite variations in the magnitude of the unbalance signal present across the detector terminals of the bridge circuit caused by the presence of substances to be detected near the sensing filament.

15 Claims, 2 Drawing Figures

THERMAL CONDUCTIVITY DETECTOR APPARATUS

The present invention relates to thermal conductivity detector apparatus for use in gas chromatography. A thermal conductivity detector, commonly called a katharometer, normally includes one or more sensing filaments, normally two, and one or more reference filaments, normally two, mounted in a heated detector block and arranged in a balanced bridge circuit. A heating current is caused to flow in the filaments. A carrier gas flowing from a source connected to gas chromatography apparatus is passed directly over the reference filaments while an output, including the carrier gas and separated components from a separating column in the gas chromatography apparatus, is passed over the sensing filaments.

In the absence of separated components, the flow of carrier gas establishes a predetermined thermal conductivity between the filaments and the walls of the detector block. Upon separation by the column of a component of a sample being analysed, the component is carried over the sensing filaments and decreases the thermal conductivity between the sensing filaments and the wall of the detector block. The decrease in thermal conductivity increases the temperature and thus the resistance of the sensing filaments by an amount proportional to the concentration and inversely proportional to the thermal conductivity of the separated component. The bridge circuit thereby becomes unbalanced and an indication of the quantity of the separated component is thereby provided.

The thermal time constant of the katharometer should be small in order to obtain an accurate indication of rapid changes in component concentration. This requires the use of relatively fine filaments. At the same time the sensitivity of the bridge circuit is greater when the heating current flowing in the filaments is relatively large so that the filaments operate at a relatively high temperature.

If a constant heating current is supplied to the input terminals of the bridge, an increase in the temperature and hence the resistance of the sensing filaments means that additional power is dissipated, which if the sample concentration is large and the value of heater current high, may be sufficient to damage or to destroy the sensing filaments.

It is an object of the present invention to provide means whereby such a disadvantage can be substantially overcome.

According to the invention there is provided thermal conductivity detector apparatus for use as a gas chromatograph output detector, comprising at least one sensing filament and at least one reference filament connected in a katharometer bridge circuit, supply means for supplying heating current to said katharometer bridge circuit, and detector means for detecting an unbalance in said katharometer bridge circuit between the resistance of said sensing and reference filaments and for providing an output signal representative of said unbalance, said supply means including current regulating means which regulates the heating current supplied to said katharometer bridge in response to variations in the resistance of said katharometer bridge between the points of application of said heating current in such a way that the mean of the temperatures of said sensing and said reference filaments is maintained substantially constant despite variations in the magnitude of the detector unbalance.

The current regulating means can be controlled by the voltage across the heater current supply terminals of the katharometer bridge circuit so that an increase in said voltage causes the current regulating means to reduce the heating current. The current regulating means can be provided with respective negative and positive control loops in respect of control signals which regulate the current supplied to the katharometer bridge circuit, the control effect of the negative feedback control loop being substantially greater than the control effect of the positive feedback control loop and the time constant of the positive feedback control loop being arranged to be longer than the thermal time constant of the katharometer bridge. The control signal applied via the negative feedback control loop can comprise a signal representative of the voltage across the heater supply terminals of the katharometer bridge and the control signal applied via the positive feedback control loop can comprise a signal representative of the heater current supplied to the heater supply terminals of the katharometer bridge. The current regulating means can include a transistor amplifier the input of which is connected to the heater current supply terminals of the katharometer bridge and means can be provided for maintaining the bleed current drawn by the input circuit of the transistor amplifier at a substantially constant proportion of the output current of the current regulating means.

The equivalent resistance, that is to say the resistance of the bridge as measured between its heater current supply terminals, increases with the resistance of the filaments. Initially, when carrier gas only is passing over both the reference and the sensing filaments and the bridge is balanced, with a heater current $I_H$, the equivalent resistance has a value $R_o$ and the sensing and reference filaments both have the same temperature $T_M$. When a separated component reaches the (or each) sensing filament, its temperature and hence its resistance rises. The equivalent resistance of the bridge rises and the value of the heating current is reduced, limiting the rise in temperature of the (or each) sensing filament.

The reduction in heating current means that less power is dissipated in the (or each) reference filament, so that the reference filament temperature falls. A condition is reached in which the sensing filaments stabilize at a temperature $T_S > T_M$ and the reference filaments at $T_R < T_M$ such that $T_S + T_R/2 \approx T_M$.
and the electrical unbalance of the bridge remains proportional to the concentration and inversely proportional to the thermal conductivity of the detected component.

Figure 2:
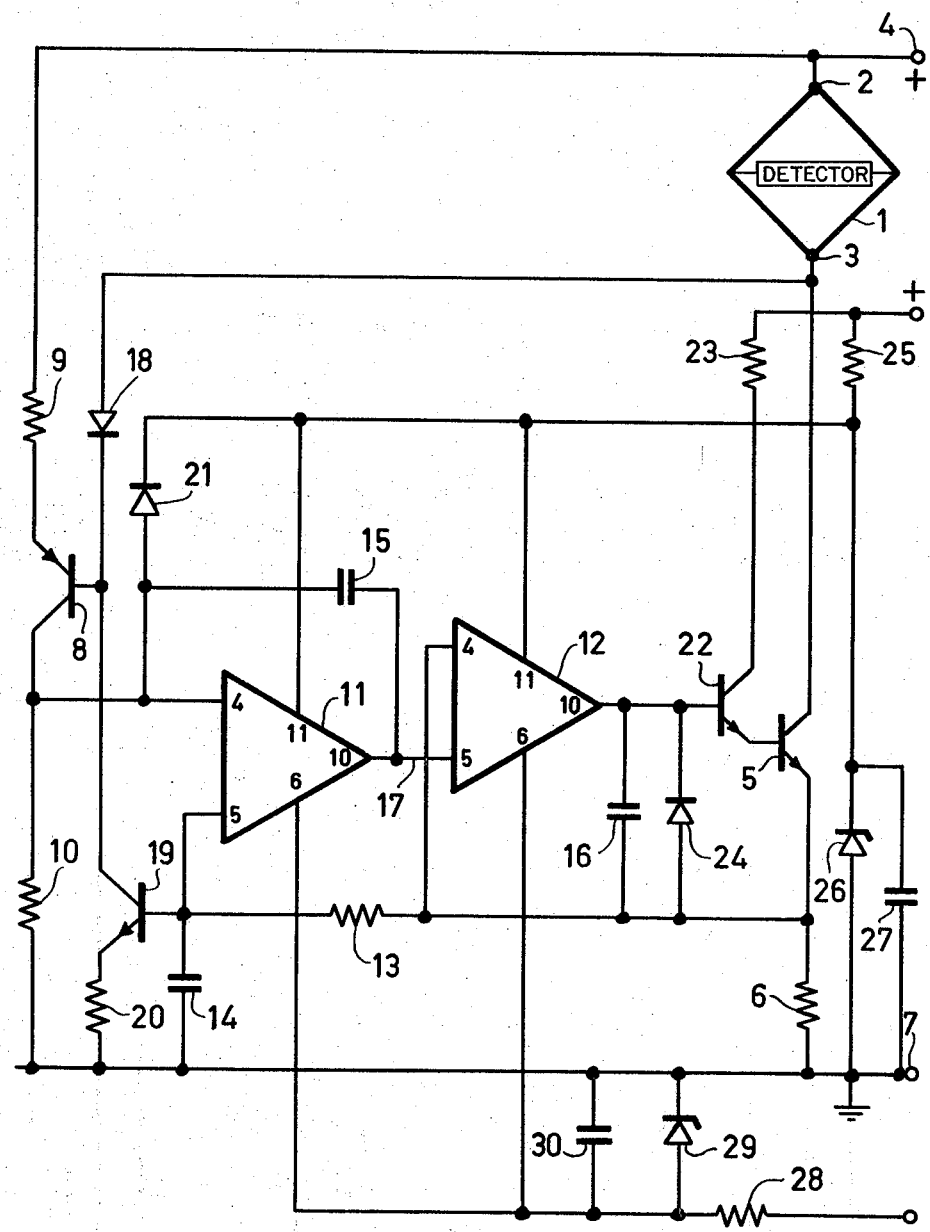

In order that the invention and the manner in which it is to be performed may be more clearly understood, an embodiment thereof will now be described, by way of example, with reference to the accompanying drawings, in which:

FIG. 1 is a block schematic diagram illustrative of an embodiment of the invention, and FIG. 2 is a more detailed schematic diagram of a katharometer power supply embodiment of FIG. 1.

Referring to FIG. 1, a conventional katharometer bridge is shown schematically at 1 and has diagonally opposed terminals 2 and 3 for the supply of heater current. Terminal 2 is connected to a positive terminal 4 of a d.c. supply source (not shown). Terminal 3 is connected to the collector of an NPN transistor 5 whose emitter is connected, via a resistor 6, to the negative (ground) terminal 7 of the d.c. source (not shown).

Terminal 3 is also connected to the base of PNP transistor 8. The emitter of the transistor 8 is connected to the positive supply terminal 4 via a resistor 9. The collector is connected to the negative supply terminal 7 via a resistor 10 and also to a negative input of an integrated circuit operational amplifier 11.

The amplifier 11 is of the kind having a negative and a positive input, by which is meant that a signal applied to the negative input is inverted while one applied to the positive input is not inverted at the output of the amplifier, the gain being the same for signals applied to either the positive or the negative inputs.

The output of the amplifier 11 is connected to the positive input of a similar operational amplifier 12 and the output of the amplifier 12 is connected to the base of the transistor 5. A connection extends from the emitter of the transistor 5 to the negative input of the amplifier 12 and via a resistor 13 to the positive input of the amplifier 11. A capacitor 14 is connected between the positive input of the amplifier 11 and the negative supply line connected to the terminal 7. A capacitor 15 is connected between the output and the negative input of the amplifier 11 and a further capacitor 16 is connected between the output and the negative input of the amplifier 12.

The heating current $I_H$ flowing in the katharometer bridge 1 is governed by the potential at the base of the transistor 5, which is in turn determined by the potential at the point 17, the positive input of the amplifier 12, and also by the value of the resistor 6, so that $I_H \alpha$ (potential at point 17/Resistance of resistor 6)

The voltage $V_K$ across the katharometer bridge is applied to the base of the transistor 8, and a signal equal to $V_K \times$ (Resistance of resistor 10/Resistance of resistor 9) is applied to the negative input of the amplifier 11. An increase in the potential across the bridge 1, which could be caused by an increase in the temperature of the sensing filaments of the bridge 1 resulting from an eluted gas component as hereinbefore explained, is applied to amplifier 11 as a positive signal, which causes the point 17 to go negative. The voltage across the resistor 6 is therefore reduced and hence the heating current $I_H$ is reduced accordingly.

The reduction in voltage across the resistor 6 is supplied via a time constant circuit comprising the resistor 13 and the capacitor 14 to the positive input of the amplifier 11. This comprises positive feedback since it tends to drive the point 17 more negative, and would in itself cause a further reduction in heating current and eventually the complete cut-off of the transistor 5.

However, the reduction in the heating current $I_H$ causes a drop in the voltage $V_K$ across the katharometer bridge 1. Consequently the signal applied to the negative input of the amplifier 11 will be reduced, and this has the effect of driving the point 17 more positive, i.e., negative feedback is applied.

Circuit parameters are chosen so that the effect of the negative feedback is substantially greater than that of the positive feedback, and that the bridge time constant is shorter than the time constant in the positive feedback path, which is given by the product of the values of the resistor 13 and the capacitor 14. Consequently a stable state is reached in which the temperature of the katharometer bridge 1 is maintained substantially constant.

FIG. 2 is a schematic diagram of a specific embodiment of the invention. Components corresponding to those shown in FIG. 1 have been given the same references. It will be seen that a diode 18 has been added which is effective to offset the base-emitter potential, $V_{be}$ of the transistor 8. This offset voltage is accurately predetermined by the current supplied by an additional transistor 19. The katharometer bleed current, namely the current flowing through the diode 18, is controlled by a transistor 19 and is a constant proportion of the total current supplied by the transistor 5.

In one practical example this proportion was approximately 1 percent. Hence the error induced by the bleed current can be less than 0.1 percent.

A further diode 21 provides protection in the event of component failure by limiting the maximum positive excursion of the input of the amplifier 11 to a level set by a zener diode 26.

A transistor 22, connected as an emitter follower, is provided to increase the efficiency of the constant current generator transistor 5. A diode 24 is arranged to latch the base of transistor 22 at the potential of the emitter of transistor 5.

A resistor 25 and a capacitor 27 connected to the zener diode 26 provide a stabilised positive supply for the amplifiers 11 and 12, and a resistor 28, a zener diode 29 and a capacitor 30 similarly provide a stabilised negative supply.

What is claimed is:

1. Thermal conductivity detector apparatus comprising, at least one sensing filament and at least one reference filament connected in a katharometer bridge, circuit, supply means coupled to the katharometer bridge input supply terminals for supplying heating current to said katharometer bridge circuit, and detector means for detecting an unbalance in said katharometer bridge circuit between the resistance of said sensing and reference filaments and for providing an output signal representative of said unbalance, said supply means including current regulating means connected in series circuit with the katharometer bridge circuit and which regulates the heating current supplied to said katharometer bridge in response to variations in the resistance of said katharometer bridge appearing between the bridge input supply terminals such a way that the mean of the temperatures of said sensing and said reference filaments is maintained substantially constant despite variations in the magnitude of the detector unbalance.

2. Apparatus as claimed in claim 1 in which said current regulating means includes an amplifier connected in series with the katharometer bridge circuit and having a control electrode controlled by the voltage across the heater current supply terminals of said katharometer bridge circuit in such a manner that an increase in said voltage causes said current regulating means to reduce said heating current.

3. Apparatus as claimed in claim 1 wherein said current regulating means includes amplifier means and negative and positive feedback control loops which supply control signals to said amplifier means so as to regulate the heating current supplied to said katharometer bridge circuit, the control effect of said negative feedback control loop on the heating current being substantially greater than the control effect of said positive feedback control loop and wherein the time constant of said positive feedback control loop is longer than the thermal time constant of said katharometer bridge.

4. Apparatus as claimed in claim 3 in which the control signal applied via said negative feedback control loop comprises a signal representative of the voltage across the heater input supply terminals of said katharometer bridge and the control signal applied via said positive feedback control loop comprises a signal representative of the heater current supplied to the heater supply terminals of said katharometer bridge.

5. Apparatus as claimed in claim 1 wherein said current regulating means includes a transistor amplifier having an input circuit which is connected to the heater current supply terminals of said katharometer bridge so as to draw a bleed current therefrom, and means for maintaining the bleed current drawn by the input circuit of said transistor amplifier at a substantially constant porportion of the output current of said current regulating means.

6. A system for measuring thermal conductivity comprising, a bridge circuit having input terminals and output terminals and including a thermal sensing element and a thermal reference element in respective arms of the bridge, power supply means coupled to said bridge input terminals for supplying current to the bridge circuit, said supply means comprising current regulating means connected in series with the bridge circuit and responsive to resistance variations appearing across the bridge input terminals for regulating the current supplied to the bridge circuit in a sense to hold substantially constant the mean value of the temperatures of said sensing and said reference elements despite a variation in the magnitude of the unbalance signal appearing at the bridge output terminals, and detector means coupled to the bridge output terminals for providing an output signal proportional to an unbalance signal produced at the output terminals by an unbalance in the resistance of said sensing and reference elements.

7. A system for measuring thermal conductivity comprising, a bridge circuit having input terminals and output terminals and including a thermal sensing element and a thermal reference element in respective arms of the bridge, power supply means coupled to said bridge input terminals for supplying current to the bridge circuit, said supply means comprising current regulating means responsive to resistance variations appearing across the bridge input terminals for regulating the current supplied to the bridge circuit in a sense to hold substantially constant the mean value of the temperatures of said sensing and said reference elements despite a variation in the magnitude of the unbalance signal appearing at the bridge output terminals, said current regulating means comprising amplifier means having input circuit means controlled by the voltage across the bridge input terminals so as to produce a negative feedback effect by said current regulating means whereby an increase in the bridge input voltage causes a decrease in the bridge current, and detector means coupled to the bridge output terminals for providing an output signal proportional to an unbalance signal produced at the output terminals by an unbalance in the resistance of said sensing and reference elements.

8. A system as claimed in claim 7 further comprising means responsive to the bridge current for supplying a positive feedback signal to said amplifier input circuit means whereby the current regulating means responds to a decrease in bridge current to cause a further decrease in said bridge current.

9. A system for measuring thermal conductivity comprising, a bridge circuit having input terminals and output terminals and including a thermal sensing element and a thermal reference element in respective arms of the bridge, power supply means coupled to said bridge input terminals for supplying current to the bridge circuit, said supply means comprising current regulating means responsive to resistance variations appearing across the bridge input terminals for regulating the current supplied to the bridge circuit in a sense to hold substantially constant the mean value of the temperatures of said sensing and said reference elements despite a variation in the magnitude of the unbalance signal appearing at the bridge output terminals, said current regulating means comprising amplifier means having negative and positive feedback control loops which supply control signals to said amplifier means for regulating the current supplied to said bridge circuit, said negative feedback control loop producing a greater control effect on said bridge current than said positive feedback control loop, and detector means coupled to the bridge output terminals for providing an output signal proportional to an unbalance signal produced at the output terminals by an unbalance in the resistance of said sensing and reference elements.

10. A system as claimed in claim 9 wherein said positive feedback control loop includes a resistor and capacitor providing an RC time constant that is longer than the thermal time constant of the bridge circuit.

11. A system as claimed in claim 9 wherein said negative feedback control loop includes means for deriving a control signal that is determined by the voltage across the bridge input terminals and said positive feedback control loop includes means for deriving a control signal that is a function of the bridge current.

12. A system as claimed in claim 6 wherein said current regulating means comprises, a first transistor amplifier connected in series with the bridge circuit across a source of voltage, a second transistor amplifier with its control input circuit connected in circuit to receive a control signal indicative of the voltage across the bridge input terminals and an output circuit coupled to the control electrode of the first transistor amplifier, said control signal producing a negative feedback control on the bridge current, and means responsive to the bridge current for deriving a positive feedback control signal that is applied to the control electrode of the first transistor amplifier.

13. A system as claimed in claim 12 further comprising an operational amplifier having a first input coupled to the output circuit of the second transistor amplifier and a second input coupled via an RC circuit to the positive feedback control signal deriving means, the output of said operational amplifier being coupled to the control electrode of the first transistor amplifier to apply thereto the negative and positive control signals.

14. A system for measuring thermal conductivity comprising, a bridge circuit having input terminals and output terminals and including a thermal sensing element and a thermal reference element in respective arms of the bridge, power supply means coupled to said bridge input terminals for supplying current to the bridge circuit, said supply means comprising current regulating means responsive to resistance variations appearing across the bridge input terminals for regulating the current supplied to the bridge circuit in a sense to hold substantially constant the mean value of the temperatures of said sensing and said reference elements despite a variation in the magnitude of the unbalance signal appearing at the bridge output terminals, said current regulating means comprising an amplifier connected in circuit to regulate the bridge current and having an input control circuit, means for deriving a negative feedback voltage proportional to the voltage across the bridge input terminals, means responsive to the bridge current for deriving a positive feedback voltage, and means for coupling said negative and positive feedback voltages to the input control circuit of said amplifier so as to control the bridge current as a function thereof, said negative feedback voltage being arranged to have a greater control effect than said positive-feedback voltage, and detector means coupled to the bridge output terminals for providing an output signal proportional to an unbalance signal produced at the output terminals by an unbalance in the resistance of said sensing and reference elements.

15. A system as claimed in claim 6 wherein said power supply means comprises a pair of DC voltage supply terminals and said current regulating means is connected in series with the bridge circuit across said DC supply terminals.

* * * * *